United States Patent [19]

Nishijima

[11] Patent Number: 5,464,648
[45] Date of Patent: Nov. 7, 1995

[54] PROCESS FOR PREPARING A COHESIVE MASS OF HERRING EGGS

[76] Inventor: Hideo Nishijima, 1720 Salzbourg Crescent, Quebec, Canada, J4X 1W1

[21] Appl. No.: 163,634

[22] Filed: Dec. 9, 1993

[51] Int. Cl.⁶ ..................................... A23L 1/328
[52] U.S. Cl. ......................... 426/643; 426/524
[58] Field of Search ................... 426/643, 418, 426/513, 524

[56] References Cited

U.S. PATENT DOCUMENTS

| 7,895 | 1/1851 | Westacott . | |
|---|---|---|---|
| 3,914,422 | 10/1975 | Chen | 426/643 X |
| 4,181,739 | 1/1980 | Santo | 426/272 |
| 4,477,476 | 10/1984 | Kagawa et al. | 426/643 X |

FOREIGN PATENT DOCUMENTS

| 999477 | 11/1976 | Canada . | |
|---|---|---|---|
| 1099142 | 4/1981 | Canada . | |
| 1174512 | 9/1984 | Canada . | |
| 2620308 | 3/1989 | France | 426/643 |
| 58-179465 | 10/1983 | Japan | 426/643 |
| 59-45827 | 3/1984 | Japan | 426/643 |
| 60-091937 | 5/1985 | Japan . | |
| 60-078532 | 5/1985 | Japan . | |
| 3-83561 | 4/1991 | Japan | 426/643 |

*Primary Examiner*—Arthur L. Corbin
*Attorney, Agent, or Firm*—Ronald S. Kosie; Robert Brouillette

[57] ABSTRACT

A process is provided for the preparation of a cohesive mass of herring eggs from loose herring eggs, particularly the loose eggs of the North Atlantic herring. A cohesive mass of herring eggs may be obtained by subjecting loose herring eggs to a washing stage and subjecting washed herring eggs obtained from the washing stage to a cohesion stage. The washing stage may comprise contacting the loose eggs with a saline solution.

23 Claims, No Drawings

PROCESS FOR PREPARING A COHESIVE MASS OF HERRING EGGS

BACKGROUND OF THE INVENTION

The present invention relates to a process for the preparation of a cohesive mass of herring eggs from loose herring eggs, particularly the loose eggs of the (North) Atlantic herring.

Herring can be found in cold northerly waters, such as those of the Pacific ocean, the Atlantic ocean, the Bering sea, the Baltic sea, the irish sea, Barents sea, the sea of Japan, the Okhotsk sea, the Yellow sea, the East china sea, the Norwegian sea, the North sea, the Korean sea and the East Siberian sea. Thus, for example, herring is caught in the North Pacific area along the west coasts of the United States and Canada; herring is also caught in the North Atlantic area along the east coasts of the United States and Canada, such as for example off the coast of the New England states and the Maritime provinces of eastern Canada (e.g. Newfoundland).

The whole ovary of Pacific herring is eaten in Japan as salt cured herring roe. The cured Pacific herring ovary or roe is known in Japan as salted "kazunoko". Kazunoko is prepared by soaking the mature whole ovaries (containing eggs) of Pacific herring in a salt solution to thereby cure and form the eggs into a hardened aggregation. Kazunoko is highly prized in Japan and is used as an expensive, gourmet food which is very popular during the New Year holiday season.

Although the herring in the above mentioned areas are all of the same family the ovary of herring caught in one area does not necessarily have the same characteristics as the ovary of herring caught in another. Thus, for example, the ovary of the Pacific herring (Clupea pallashii) is different from the ovary of Atlantic herring (Clupea harengus). Both the ovarial membrane and the cohesive character of the eggs differ greatly between Pacific and Atlantic herring. The ovarial membrane of Atlantic herring is relatively weak and the membrane is easily broken when being extracted from the fish; accordingly, it is very difficult to obtain satisfactory whole ovaries of Atlantic herring on a commercial scale since the tendency is for the ovaries to break open and for the eggs to spill out as loose herring eggs. Additionally, eggs of the Atlantic herring possess a relatively low degree of cohesiveness as compared to the eggs of Pacific herring. As a result, while whole Pacific herring ovaries are easily processed into cured herring roe suited for Japanese consumption, the ovary and eggs of the Atlantic herring are generally wasted because there is presently no efficient process for processing them into expensive "kazunoko" or a "kazunoko"-type food item comparable to that obtained from Pacific herring. The ovaries and loose eggs of Atlantic herring thus have a very low commercial value.

Various attempts have heretofore been made to process loose herring eggs.

Thus, for example, Canadian patent no. 1,099,142 teaches a method of processing loose eggs of Atlantic herring into a coherent or cohesive product. The process as taught by this patent requires that fresh loose eggs must first be de-blooded by being washed with (fresh, i.e. unsalted) water; thereafter the (fresh) water washed eggs are drained, placed into a container having the desired shape and subjected to a series of three to five soakings in salt solutions of different concentrations, the salt (i.e. sodium chloride) concentrations ranging upwardly from a least 8% of saturation in the initial stage to the saturation level in the final stage; it is to be understood herein that the percentage concentration of salt is given in terms of a percentage of the salt concentration at the saturation level of salt dissolved in water. Each soaking, including the initial soaking, is taught as extending over a relatively prolonged period of time (e.g. from 20 to 24 hours or longer). The process as taught by this patent is thus relatively complicated (i.e. it requires that the eggs be fresh water washed and then be transferred between a plurality of solutions of different salt concentration); the process as taught by this Canadian patent is also relatively time consuming (i.e. it may take from three to ten days to obtain a finished product). Additionally, the process as taught requires that the herring eggs be fresh; this may put an excessive burden on any herring egg processing facility during the usual fishing season (1–1.5 months) while leaving the plant idle the rest of the time.

Accordingly, it would be advantageous to have a less complicated and time consuming process whereby the loose eggs of herring (e.g. Atlantic herring, Pacific herring, Baltic sea herring and the like) may be processed into a cohesive mass of cured herring eggs which possesses a crispness the same as or approaching that of salted kazunoko obtained from whole Pacific herring ovaries and which could thus be sold at prices approaching that of kazunoko prepared from the ovary of the Pacific herring.

It would also be advantageous to have a process whereby the herring eggs need not be more or less immediately processed after the fish is caught and which would still provide a cohesive mass of cured herring eggs which possesses a crispness the same as or approaching that of salted kazunoko obtained from whole Pacific herring ovaries.

SUMMARY OF THE INVENTION

In accordance with the present invention, it has surprisingly been found that herring eggs of good or acceptable freshness (i.e. eggs from freshly caught herring) may be advantageously pre-frozen prior to processing into a cohesive mass provided that the eggs are frozen in an unwashed state. The herring eggs may be frozen from a loose state or as eggs still contained by the ovarial membrane; if the eggs are within an intact ovarial membrane the outer surface of the membrane may be washed (i.e. lightly) provided that the eggs within the membrane sack are not essentially affected by such wash. If the herring eggs are fresh water washed prior to being frozen their self cohesive character is significantly reduced such that they may essentially lose their cohesive character or at the very least may take a relatively too long time to gel together for desirable processing purposes (i.e. as compared to the process of the present invention).

Thus, the present invention, in a first general aspect provides a method for processing herring eggs, said method comprising subjecting unwashed herring eggs to a quick freezing stage wherein unwashed herring eggs are brought to a freezing temperature of −30° C. or lower.

In a more particular aspect the present invention provides for or in a process for the preparation of a coherent mass of herring eggs, comprising subjecting loose herring eggs to a washing stage and subjecting washed herring eggs obtained from the washing stage to a cohesion stage, the improvement wherein, prior to the washing stage, unwashed herring eggs are subjected to a quick freezing stage wherein unwashed herring eggs are brought to a freezing temperature of −30° C. or lower (for example, −35° C. or lower, e.g. −40° C. or lower, e.g. −30° C. to −50° C.; e.g. −35° C. to −50° C.; e.g. −40° C.).

It is to be understood herein that a quick freezing stage is a freezing stage which will bring (fresh) unwashed herring eggs to a temperature of −30° C. or lower in a relatively short period of time. Since the herring eggs are relatively oily, a quick deep freezing to a temperature of −30° C. or less is needed in order to preserve the desired palatable characteristics of the eggs. The eggs may, for example, be frozen in a quick, sharp or shock manner, to said deep freeze temperature in less than 3 to 4 hours. Herring eggs may, for example, be deep frozen using a plate or contact freezer manufactured by APV Parafregze, Thetford, England under model MC #4239; any suitable type of freezer capable of quick freezing the herring eggs may of course be used (e.g. an ammonia based freezer, a $CO_2$ based freezer, a freon based freezer, a nitrogen based freezer and the like).

The quick frozen eggs may, thereafter, be defrosted at any time (e.g. more or less immediately, e.g. within minutes or hours), as desired or when needed, prior to being subjected to a washing stage such as discussed herein. The quick frozen eggs may be stored at a temperature of about −18° C. or lower (e.g. −20° C. or lower) for a period of up to 2 to 3 years provided that prior to storage they are ice glazed after deep freezing and are poly wrapped with a suitable plastic sheet or film to exclude oxygen and inhibit dehydration; glazing may be accomplished by dipping deep frozen eggs into cold water so as to form an ice film about the frozen eggs mass. By exploiting such a freezing stage, it would not be necessary to rush to process, as soon as possible, all of the fresh eggs made available during the fishing season; such seasonal processing would require a relatively large processing facility to handle the large quantity or volume of eggs made available in a relatively short period of time. In accordance with this particular aspect of the present invention a large quantity of eggs may be stored in a frozen state and be processed, as desired or required, by a relatively smaller plant which may spread the processing over a longer period of time so as to facilitate control of the quality of the finished product. Defrosting may be accomplished by leaving the eggs at a suitable room temperature (e.g. 6° C. to 20° C.) until they are defrosted i.e. the eggs are loose. If the defrosted eggs are still in the ovarian membrane it will be necessary to extract the eggs from the membrane; this may be accomplished by any suitable means such by use of a mechanical mincer (e.g. a Bone separator Baader model 694, by Baader GmbH, Germany) or by rubbing the ovaries manually over a wire mesh of suitable screen size (e.g. first with a 6 mm size screen followed by screening over a 1.5 mm mesh size) to separate the eggs from the membrane.

In accordance with the present invention, it has also been surprisingly found that loose herring eggs may be advantageously processed by first washing, unwashed, herring eggs with a salt solution rather than with fresh water.

Accordingly, the present invention in a further aspect generally provides, a method for processing herring eggs, said method comprising contacting unwashed loose herring eggs with an aqueous saline solution comprising sodium chloride so as to obtain washed loose herring eggs.

DETAILED DESCRIPTION OF THE INVENTION

In accordance with a more particular aspect, the present invention provides a process for the preparation of a coherent mass of herring eggs, comprising subjecting loose herring eggs to a washing stage and subjecting washed herring eggs obtained from the washing stage to a cohesion stage, characterised in that loose unwashed herring eggs are subjected to a saline washing stage, in that said saline washing stage comprises contacting herring eggs with an aqueous saline solution comprising sodium chloride so as to obtain washed herring eggs, in that washed herring eggs obtained from said saline washing stage are subjected to said cohesion stage, and in that said cohesion stage comprises maintaining a wet mass of washed herring eggs in a gathered together state for a time period sufficient to obtain said coherent mass of herring eggs.

In accordance with the present invention, the cohesion stage may include exposing the washed herring eggs to air.

In accordance with the present invention, the aqueous saline wash solution may, for example, comprise sodium chloride (i.e. herein sometimes generally referred to by the common name "salt") at a concentration which is in the range of about 4% to about 20% of sodium chloride saturation, e.g. about 12% to about 16% of sodium chloride saturation. As mentioned above, it is to be understood herein that the concentration of salt is given in terms of a percentage of the salt concentration at the saturation level of salt dissolved in water; for example, a concentration of 10% of saturation means that salt is present in an amount equal to 10% of that needed to saturate water and so on. Preferably, the saline wash solution may comprise seawater, e.g. seawater having a salt concentration of about 12% of saturation.

In accordance with the present invention, it is to be understood that the expression "a gathered together state" characterises the eggs as being piled up or bunched up together such that the eggs may (spontaneously) adhere together due to their inherent cohesive property. The eggs may, for example, be maintained in said gathered together state for a time period of up to 8 hours (depending on the process used, e.g. up to four hours, up to one hour, etc.) at which time the mass of eggs may be sufficiently coherent so as to allow the coherent mass to be subjected to a curing stage as discussed below or to be prefrozen then subjected to the curing stage. For the cohesion stage, eggs and saline solution of a lower layer of a washing stage (e.g. lower layer of a final washing stage) may, for example, be poured into a mold of predetermined shape and size; cohesion in the mold may take place with wet eggs or eggs soaking in saline solution as shall be discussed below.

Generally, for a cohesion stage the eggs may for example be at a temperature of from about 2° C. to about 18° C.

The unwashed herring eggs to be washed with the saline solution should of course be herring eggs of good or acceptable freshness; if for example the eggs of fresh fish are to be processed, the higher the storage temperature of the fresh eggs, the faster the fish eggs must be processed in order to avoid spoilage (e.g. eggs from fresh fish stored unfrozen at 2° C. to 520 C. may be processed provided that the eggs are preferably subjected to the washing stage within 12 hours of the fish being caught). Alternatively, the fresh herring eggs may be subjected to the above mentioned freezing stage prior to being subjected to the washing stage after being suitably thawed. If the eggs are still associated with the ovarian membrane, they may be separated from the membrane as mentioned above.

In accordance with the present invention, the herring eggs may be washed with the saline wash solution at a temperature chosen on the basis that spoilage is to be avoided; the temperature may for example be in the range of from about 2° C. to about 18° C. (e.g. be from about 2° C. to about 15° C.; e.g. be from about 5° C. to about 16° C.; e.g. be from about 10° C. to about 15° C; e.g. be about 10° C). The washing may be effected in any suitable way and over any suitable or desired time period, provided that, prior to being gathered together into a mass of desired shape for spontaneously cohering together into the finished coherent product, the obtained washed eggs have a spontaneous cohesion or sticky character and a desired state of cleanliness (e.g. are deblooded, are separated from pieces of ovary membrane, from immature eggs, fish scales, etc.); saline washing may, for example, be for a total time period of from about 2 to about 20 minutes, e.g. 3 minutes; as with the saline wash solution temperature, the wash time is chosen on the basis that spoilage is to be avoided.

As with the washing stage, the temperature and time period for the cohesion stage are chosen on the basis that spoilage is to be avoided.

In accordance with the present invention, a saline washing stage may comprise contacting a mass of unwashed herring eggs with an aqueous saline solution comprising sodium chloride so as to obtain an aqueous mixture comprising a first upper aqueous saline layer and a second lower aqueous saline layer, said second aqueous saline layer comprising a mass of washed herring eggs (e.g. loose eggs).

The process may comprise a single wash stage as defined above, provided that the amount of foreign matter associated with the eggs (e.g. blood, immature eggs, etc) may be effectively removed thereby. Thus, for example, loose unwashed herring eggs may be washed as follows:

a) loose unwashed herring eggs are contacted in a container (e.g. a mold) with a suitable amount of saline solution (i.e. the quantity of saline solution may be predetermined by taking sample amounts of eggs and mixing each sample with a different given amount of solution and thereafter using the ratio of eggs to solution which gives the desired or necessary cleaning results);

b) the mixture of herring eggs and saline solution is stirred or agitated (e.g. manually using a person's hand or a stirring stick) sufficiently to cause the eggs to be dispersed in the solution but not so strongly so as to unduly damage the eggs (e.g. for about 20 second); and c) thereafter the mixture is allowed to stand, for from about 1 to 2 minutes, so as to allow herring eggs to settle to the bottom of the container and obtain an aqueous mixture comprising an upper aqueous saline layer (e.g. containing blood, scale, etc.) and a lower aqueous saline layer comprising a mass of washed (e.g. loose) herring eggs.

The wash container (e.g. a rectangular container) for the above, may be sized in accordance with the amount of eggs it is desired to wash such that, the eggs in step c) above, may settle into a suitable mass of loose eggs which may be subjected to the cohesion stage by merely leaving the entire aqueous mixture (i.e. the two layers) in the container (e.g. mold) and letting the mixture stand undisturbed for a time sufficient to provide the desired coherent mass of herring eggs (e.g. up to 8 hours, (e.g. 5 to 6 hours), or preferably, up to 3 to 4 hours (e.g. 3 hours), etc) at which point the entire saline solution including the foreign material may be separated from the cohesive egg mass, e.g. by pouring the liquid part out of the container. The obtained mass of eggs may be removed from the bottom of the container, for example, after having been cut into pieces of desired size and shape.

In accordance with the present invention, the above described washing stage may include separating the upper layer from the lower layer so as to leave behind an aqueous layer comprising a mass of loose washed herring eggs; separation may, for example, be effected by decantation, by using a container in the form of a separatory funnel (the eggs and saline solution being carried out the bottom of the container when a bottom stop cock is opened) and the like. The eggs in the obtained remaining aqueous layer may, for example, be subjected to a cohesion stage in either of the following two ways:

a) The wash container (e.g. a rectangular container) may be sized in accordance with the amount of eggs it is desired to wash such that, the eggs after separation of the upper layer, may settle into a suitably shaped mass of loose eggs. The mass of loose washed eggs may be subjected to the cohesion stage by merely leaving the entire remaining aqueous layer in the container and letting the mixture stand undisturbed for a time sufficient to provide the desired coherent mass of herring eggs (e.g. up to 4 hours; e.g. 3 to 4 hours) at which point the remaining saline solution may be separated from the cohesive egg mass, e.g. by pouring the liquid part out of the container. The obtained mass of eggs may be removed from the bottom of the container, for example, after having been cut into pieces of desired size and shape; or b) A suitably shaped container or mold (of predetermined shape and size) may be provided and after separation of the upper layer, the remaining aqueous layer containing loose washed eggs may be poured (i.e. through the air) into the mold, the pouring causing at least some air to contact at least some of the saline liquid and/or washed eggs. If desired, the mold along with its egg contents may be transferred into a larger container containing additional saline solution sufficient to at least cover the mold, preferably such that the mold is submerged to a significant degree in the additional saline solution. The mass of washed eggs may be subjected to the cohesion stage by merely leaving the mass of eggs in the mold undisturbed for a time sufficient to provide the desired coherent mass of herring eggs (e.g. in this case up to 30 minutes, e.g. 10 to 15 minutes) at which point the cohesive mass of eggs may be separated from the mold and saline solution.

Although the above has described the process in terms of a single wash stage, generally, two, three or more washing stages may be necessary in the case where the unwashed herring eggs are associated with relatively significant amounts of foreign matter such as mentioned above.

Thus if necessary or if desired, a process in accordance with the present invention may include a washing stage including separating the upper layer from the lower layer, and the eggs of the lower layer may be similarly contacted with additional saline solution so as to obtain washed herring eggs which may be subjected to a cohesion stage.

More particularly, in accordance with the present invention, the saline washing stage may comprise a first washing stage and one or more subsequent washing stages, said subsequent washing stages including at least a final washing stage, each said washing stage comprising contacting a mass of loose herring eggs with an aqueous saline solution comprising sodium chloride so as to obtain an aqueous mixture comprising a first upper aqueous saline layer and a second lower aqueous saline layer, said second aqueous saline layer comprising a mass of washed herring eggs (e.g. loose eggs), and separating said first layer from said second layer, each subsequent washing stage treating the herring eggs of the second layer of a prior washing stage, said first washing stage comprising contacting a mass of loose unwashed herring eggs with said aqueous saline solution, the herring eggs of the second layer of a final washing stage being subjected to the cohesion stage; and preferably, the sodium chloride concentration of the aqueous saline solution, for each washing stage, is at least substantially the same but may, if desired, be different.

It is to be understood herein that the expression "at least substantially the same" in relation to the salt concentrations of any two or more stages, means a salt concentration which is, for all practical purposes, the same for all of the specified stages (e.g. all of the wash stages, the wash stage and the cohesion stage, etc.).

The eggs of the above mentioned final stage may, for example, be subjected to a cohesion stage in a manner as described herein.

As may be appreciated, the mass of eggs in the above immediately described cohesion stages is maintained in the gathered together state while at the same time bathing or soaking in a saline solution.

Thus, in accordance with the present invention, during the cohesion stage the mass of washed herring eggs may, for example, be soaked in an aqueous saline solution comprising sodium chloride at a concentration which is in the range of 4 to 20% of saturation, e.g. 12 to 16% of saturation. The sodium chloride concentration of the saline solution of the cohesion stage may be different from the sodium chloride concentration of the washing stage(s). However, as mentioned above, the sodium chloride concentration of the aqueous saline solution, for the washing stage(s) and for the cohesion stage, may be at least substantially the same. Preferably, the saline solution for the cohesion stage may comprise seawater. The herring eggs may be maintained at a temperature in the range of from about 2° C. to about 18° C. (e.g. from about 5° C. to about 16° C.; e.g. from about 10° C. to about 15° C.; e.g. about 10° C.) for the cohesion stage. The eggs may be maintained in the gathered together state for a time period of up to 6 to 8 hours depending on the treatment procedure. For example, if the washed eggs are poured with saline solution through air into another mold or container, a time period of up to 1 hour may be sufficient (e.g. a time period of up to 30 minutes may be sufficient; a time period such as from 10 to 30 minutes, etc. may be sufficient). As with the washing stage, a temperature and time period is chosen for the cohesion stage on the basis that spoilage is to be avoided.

Alternatively, the saline washing stage may include a separation step wherein aqueous saline solution is separated (e.g. by suitable filtration) from the washed eggs so as to obtain wet herring eggs and a mass of so obtained wet herring eggs is subjected to said cohesion stage, said cohesion stage including exposing the mass of wet herring eggs to air. The herring eggs may be maintained at or exposed to air at a temperature in the range of from about 2° C. to about 25° C., e.g. from about 2° C. to about 15° C. (e.g. from about 6° C. to about 10° C.) for the cohesion stage. The eggs in this case may be maintained in said gathered together state for a relatively short time period of up to 1 hour, e.g. for a time period of up to 30 minutes (e.g. up to 10 to 15 minutes). For this alternative, the first and or final lower wash layer may be transferred to a forminous mold comprising a wire mesh support base covered by cheese clothe, the washed yellow eggs being poured into the cheese clothe; the saline solution (e.g. seawater) drains from the mold through the cheese clothe leaving behind a wet mass of washed eggs.

A cohesive mass of eggs as obtained by a cohesion stage mentioned above may be frozen and or cured for preservation purposes prior to being used by a consumer; if the cohesive mass is frozen the consumer may, for example, carry out a curing stage as described below.

A process in accordance with the present invention, may thus include, subsequent to said cohesion stage, a curing stage for the curing (i.e. the preservation) of a coherent mass of herring eggs obtained from the cohesion stage. The curing stage comprises soaking a coherent mass of herring eggs in a saturated aqueous saline solution for a time period sufficient to obtain a cured coherent mass of herring eggs having a desired degree of crunchiness; the saturated aqueous saline solution is saturated with sodium chloride. The coherent mass of herring eggs obtained from the cohesion stage may, for example, be soaked in said saturated sodium chloride solution for a time period of preferably at least 20 hours so as to obtain a product which meets the general market taste (e.g. for a time period of from 20 to 24 hours). The curing temperature is, of course, to be chosen with an eye to avoiding damaging the egg product. The curing may, thus, for example, be effected at a temperature of from about 2° C. to about 18° C., (e.g. from about 2° C. to about 15° C.; from about 6° C. to about 15° C.; at about 10° C.); the curing may be effected using chilled saturated saline solution. The mass of coherent eggs may, for example, if necessary or desired, be kept soaked in 100% brine (a saturated salt solution) for up to 1 to 2 years or longer provided that the temperature of the soaking mass is kept at a temperature of from 0° C. to about 5 ° C.

A process in accordance with the present invention may include, prior to the curing stage, a quick freezing stage as previously discussed above. Thus, prior to the curing stage, a coherent mass of herring eggs obtained from the cohesion stage may be a subjected to a quick freezing stage (such as described above) wherein the coherent mass of eggs is brought to a freezing temperature of −30° C. or lower, (for example, −35° C. or lower, e.g. −40° C. or lower, e.g −30° C. to −50° C.; e.g. −35° C. to −50° C.; e.g. −40° C.). The quick frozen eggs, as mentioned above, may thereafter, be defrosted at any time, (e.g. more or less immediately, e.g. within minutes or hours), as desired or when needed, prior to being subjected to a curing stage such as discussed herein; the eggs may be stored at −18° C. or lower (e.g. at −20° C. or lower) for a period of up to 2 to 3 years if the deep frozen mass is ice glazed and suitably polywrapped for storage. The eggs may be defrosted prior to or during the above mentioned curing stage. Defrosting may effected by soaking the eggs in seawater at 2 ° C. to 15° C. (e.g. up to 2 to 3 hours depending on the size and thickness of the mass of eggs) followed by soaking in the saturated salt solution for curing.

The cured product may be vacuum wrapped or sealed (in known manner) and stored at 0° C. to 5° C. prior to being sold to the consumer. The customer may defrost and desalt the product as discussed below prior to its being eaten.

If desired, in those cases where cohesion occurs relatively quickly, the washed eggs may be placed immediately in a suitable quick freezer such that the cohesion phase may occur more or less while the egg mass is in the process of being quick frozen over a time period of 3 to 4 hours; i.e. in cases as described herein where a suitably cohesive egg mass may be obtained in 1 hour or less (e.g. in less than 30 minutes).

The process of the present invention makes it possible, for example, to prepare a cured cohesive product from the Atlantic herring which has a crispness, texture and feeling similar to that of salted kazunoko; it is to be understood however, that the process may also be applied to loose Pacific herring eggs or the eggs of herring from other areas. In accordance with the present invention, it is possible to form loose herring eggs into a cohesive product having a desired shape merely by filling a suitably shaped container with loose saline washed eggs. Additionally, if desired, prior to subjecting the washed loose eggs to the cohesion stage, it is possible to mix other seafood items such as lobster eggs, etc. with the loose eggs, provided that the additional stuffing is added in an amount and is of a type which does not interfere unduly with the cohesion of the final product; the resultant product is a composite cohesive product.

In particular, loose herring eggs may be obtained by slitting the bellies of Atlantic herring and collecting the ovaries therefrom or by collecting the whole and or broken ovaries obtained in the course of filleting the herring; the ovaries are broken open so as to expose the individual eggs by methods mentioned above e.g. manually using a wire mesh. The above described loose Atlantic herring eggs are (usually completely) deblooded by washing with saline solution, after which they may, for the cohesion stage, be placed in a container, such as a pan, having the desired shape. By soaking a coherent mass of herring eggs obtained from the cohesion stage in saturated salt solution, the individual eggs become even more hardened, whereby a product which is crispy like salted kazunoko made from the Pacific herring is obtained. The salt cured product is usually desalted (e.g. by the consumer) prior to being consumed. The cured product of the present invention retains good coherentness even after it is desalted by immersing in fresh water before use; desalination may be effected by soaking the salt cured product in fresh water at a temperature of about 2° C. to about 20° C. (e.g. at about 12° C.) for a time period depending on the thickness/size of the product (e.g. for about 10 minutes). The desalted product can be eaten as is or in conjunction with a desired condiment(s), sauce(s) or seasoning(s); the cured product may for example be used for the preparation of "sashimi" or "sushi" in the typical Japanese cuisine.

It is to be understood herein, that if a "range" or "group of substances" and the like is mentioned with respect to a particular characteristic of the present invention, the present invention relates to and explicitly incorporates herein each and every specific member and combination of sub-ranges or sub-groups therein whatsoever; and each sub-range or sub-group likewise includes each and every specific member and sub-combination of thereof. Thus, any specified range or group is to be understood as a shorthand way of referring to each and every member of a range or group individually as well as each and every possible sub-ranges or sub-groups encompassed therein. For example, with respect to temperature, the mention of the range of 2° C. to 25° C. is to be understood as specifically incorporating herein each and every individual temperature state as well as sub-range, such as, for example, 10° C., 5° C. to 15° C., etc.; similarly with respect to ranges for concentrations, time (e.g. a range of up to 8 hour includes 15 minutes, 5 to 10 minutes, 5 minutes, 1 hour, up to 3 to 4 hours, etc.; a range of up to 3 to 4 hours includes 3 hours, 4 hours, 2.75 hours, 3.5 hours, etc.), etc. .

The invention will now be described in relation to example embodiments thereof, it being understood that the examples are presented as illustrative only and that they not intended to limit the scope of the invention.

EXAMPLES

EXAMPLE 1

Atlantic herring (Clupea harengus) which were caught in the Bay of Fundy off the east coast of Nova Scotia were gutted to collect their ovaries. The fish were at a temperature of about 5° to 16° C. The fish were gutted about 3 to 12 hours after they were caught. 4.5 Kg of the ovaries thus obtained was passed through a (cool) mincer or bone separator Baader model no. 694, by Baader GmbH, Germany to separate the eggs from the ovarial membranes. The large pieces of membrane were removed by hand.

Four (4) kg of loose unwashed herring eggs were placed in a stainless steel pan measuring 27 cm (width)×38.5 cm (length)×10.5 cm (depth). 6 Kg of cold seawater (10° C.) was added to the pan and the mixture was stirred by hand for about 20 seconds. Thereafter, the mixture was left standing (i.e. for about 1 to 2 minutes) until the aqueous mixture separated into a lower saline layer comprising loose washed eggs and an upper saline layer; depending on the extent to which the unwashed eggs were associated with foreign matter such as blood the upper layer was reddish in tinge (i.e. it comprised blood and other foreign material e.g. immature eggs, scales and the like). The (reddish) upper layer was (essentially) removed by decantation. The washing operation was repeated two or three times using additional seawater (i.e. 6 kg of seawater at 10° C.). The final washing provided a lower saline layer of loose washed yellow eggs.

The lower saline layer of the final washing was poured (i.e. through the air) into a mold (stainless steel) container measuring 29.2 cm (width)×48.25 cm (length)×7.65 cm (depth) such that the loose eggs covered the bottom of the container in a relatively thick mat. The eggs were allowed to stand undisturbed soaking in the seawater of the lower layer for 10 to 30 minutes at 10° C. until a suitably cohesive egg mass was obtained.

The cohesive egg mass was separated from the seawater wash liquid and was removed from the mold container; the cohesive mass had a thickness of about 5.72 cm. The cohesive egg mass was cured by being immediately immersed in a saturated solution of sodium chloride; the saturated solution had a temperature of 10° C. The curing mixture was maintained at a temperature of 10° C. for a time period of 24 hours; after this time period the cured egg mass was drained. The drained cured egg mass was vacuum sealed and kept chilled at 0° C. to 5° C. for storage purposes. The obtained cured egg mass was desalted in fresh water at 2° C. to 20° C. for a period of 10 minutes; the desalting time may vary depending on the thickness and size of the egg mass. The desalted cohesive egg mass had good cohesion and crunch.

EXAMPLE 2

4 kg of loose unwashed Atlantic herring eggs obtained as described in Example 1 above were placed in a stainless steel pan measuring 27 cm (width)×38.5 cm (length)×10.5 cm (depth). 6 Kg of cold seawater (10° C.) was added to the pan and the mixture was stirred by hand for about 20 seconds. Thereafter, the mixture was left standing (i.e. for about 1 to 2 minutes) until the aqueous mixture separated into a lower saline layer comprising loose washed eggs and an upper reddish saline layer; depending on the extent to which the unwashed eggs were associated with foreign matter such as blood the upper layer was reddish in tinge (i.e. it comprised blood and other foreign material e.g. immature eggs, scales and the like). The (reddish) upper layer was then (essentially) removed by decantation.

The lower saline layer of the washing was left in the container such that loose the eggs covered the bottom of the container in a relatively thick mat. The eggs were allowed to stand undisturbed soaking in the seawater of the lower layer for about 3 to 4 hours at 11° C. until a suitably cohesive egg mass was obtained.

The cohesive egg mass obtained was separated from the seawater wash liquid and was removed from the mold container by being cut into pieces about 12 cm×29 cm; the cohesive mass had a thickness of about 5.5 cm. The cohesive egg mass was cured by being immediately immersed in a saturated solution of sodium chloride; the saturated solution had a temperature of 10° C. The curing mixture was maintained at a temperature of 10° C. for a time period of 24 hours; after this time period the cured egg mass was drained. The drained cured egg mass was vacuum sealed and kept chilled at 0° C. to 5° C. for storage purposes. The obtained cured egg mass was desalted in fresh water at 2° C. to 20° C. for a period of 10 minutes; the desalting time may vary depending on the thickness and size of the egg mass. The desalted cohesive egg mass had good cohesion and crunch.

EXAMPLE 3

4 kg of loose unwashed Atlantic herring eggs obtained as described in Example 1 above, were placed in a stainless steel pan measuring 27 cm (width)×38.5 cm (length)×10.5 cm (depth). 6 Kg of cold seawater (10° C.) was added to the pan and the mixture was stirred by hand for about 20 seconds. Thereafter, the mixture was left standing and the aqueous mixture separated (i.e. after about 1 to 2 minutes) into a lower saline layer comprising loose washed eggs and a reddish upper saline layer; depending on the extent to which the unwashed eggs were associated with foreign matter such as blood the upper layer was reddish in tinge (i.e. it comprised blood and other foreign material e.g. immature eggs, scales and the like); the eggs covered the bottom of the container in a relatively thick mat.

The aqueous mixture comprising the (reddish) upper layer and the lower saline layer of the washing were allowed to continue standing undisturbed with the eggs soaking in the seawater of the lower layer for about 3 to 4 hours at 11° C. until a suitably cohesive egg mass was obtained.

The cohesive egg mass obtained was separated from the seawater wash liquid and was removed from the mold container by being cut into pieces about 12 cm×29 cm; the cohesive mass had a thickness of about 5.5 cm. The cohesive egg mass was cured by being immediately immersed in a saturated solution of sodium chloride; the saturated solution had a temperature of 10° C. The curing mixture was maintained at a temperature of 10° C. for a time period of 24 hours; after this time period the cured egg mass was drained. The drained cured egg mass was vacuum sealed and kept chilled at 0° C. to 5° C. for storage purposes. The obtained cured egg mass was desalted in fresh water at 2° C. to 20° C. for a period of 10 minutes; the desalting time may vary depending on the thickness and size of the egg mass. The desalted cohesive egg mass had good cohesion and crunch.

EXAMPLE 4

4 kg of loose unwashed Atlantic herring eggs obtained as described above in example 1, were placed in a stainless steel pan measuring 27 cm (width)×38.5 cm (length)×10.5 cm (depth). 6 Kg of cold seawater (10° C.) was added to the pan and the mixture was stirred by hand for about 20 seconds. Thereafter, the mixture was left standing (i.e. for about 1 to 2 minutes) until the aqueous mixture separated into a lower saline layer comprising loose washed eggs and an upper saline layer; depending on the extent to which the unwashed eggs were associated with foreign matter such as blood the upper layer was reddish in tinge (i.e. it comprised blood and other foreign material e.g. immature eggs, scales and the like). The (reddish) upper layer was (essentially) removed by decantation. The washing operation was repeated two or three times using additional seawater (i.e. 6 kg of seawater at 10° C.). The final washing provided a lower saline layer of loose washed yellow eggs.

The saline solution of the lower layer of the final washing was drained from the loose eggs; the drained wet eggs covered the bottom of the container in a relatively thick mat. The wet eggs were allowed to stand undisturbed for 10 to 15 minutes at 10° C. until a suitably cohesive egg mass was obtained.

The cohesive egg mass obtained was removed from the mold container by being cut into pieces about 12 cm×29 cm; the cohesive mass had a thickness of about 5.5 cm. The cohesive egg mass was cured by being immediately immersed in a saturated solution of sodium chloride; the saturated solution had a temperature of 10° C. The curing mixture was maintained at a temperature of 10° C. for a time period of 24 hours; after this time period the cured egg mass was drained. The drained cured egg mass was vacuum sealed and kept chilled at 0° C. to 5° C. for storage purposes. The obtained cured egg mass was desalted in fresh water at 2° C. to 20° C. for a period of 10 minutes; the desalting time may vary depending on the thickness and size of the egg mass. The desalted cohesive egg mass had good cohesion and crunch.

EXAMPLE 5

4.5 kilograms of unwashed Atlantic herring ovaries and eggs, obtained as described in example 1 were placed in a plate or contact freezer manufactured by APV Parafregze, Thetford, England under model MC #4239 and in a time period of 3 to 4 hours were frozen to a temperature of −45° C. The so quick frozen eggs were stored at −20° C. for 60 days. The frozen eggs were defrosted by leaving them at a temperature of 15° C. for about 1.5 days. Thereafter, the defrosted eggs were treated as in example 1 starting from subjecting the ovaries to the above mentioned mincer.

The obtained desalted (cured) cohesive egg mass had good cohesion and crunch.

EXAMPLE 6

Example 1 was repeated but prior to curing, the mass of coherent eggs were placed in a plate or contact freezer manufactured by APV Parafregze, Thetford, England under model MC #4239 and in a time period of 3 to 4 hours were frozen to a temperature of −45° C. The so quick frozen eggs were stored at −20° C. for 55 days. The frozen eggs were defrosted by leaving them in seawater at 10° C. for about 2 to 3 hours. Thereafter the eggs were cured as in example 1.

The obtained desalted (cured) cohesive egg mass had good cohesion and crunch.

I claim:

1. A process for the preparation of a coherent mass of herring eggs, comprising subjecting loose unwashed herring eggs to a saline washing stage, subjecting the loose washed herring eggs obtained from the washing stage to a cohesion stage, subjecting a coherent mass of herring eggs obtained from the cohesion stage to a quick freezing stage, defrosting the frozen herring eggs obtained from the quick freezing stage, and subjecting the defrosted coherent mass of herring eggs to a curing stage for the curing thereof, said saline washing stage comprising contacting the loose unwashed herring eggs with an aqueous washing saline solution comprising sodium chloride so as to obtain washed loose herring eggs, said sodium chloride being present in the washing saline solution at a concentration in the range of 4% to 20% of sodium chloride saturation, said cohesion stage comprising maintaining a wet mass of the washed loose herring eggs obtained from said saline washing stage, in a gathered together state for a time period sufficient to obtain said coherent mass of herring eggs, said freezing stage being a quick freezing stage wherein said coherent mass of herring eggs obtained from the cohesion stage is brought to a freezing temperature of −30° C. or lower and said curing stage comprising soaking the defrosted coherent mass of herring eggs in an aqueous saline solution saturated with sodium chloride for a time period sufficient to obtain a cured coherent mass of herring eggs.

2. A process as defined in claim 1, comprising a quick freezing stage wherein said coherent mass of herring eggs obtained from the cohesion stage is brought to a freezing temperature of from −30° C. to −50° C.

3. A process for the preparation of a coherent mass of herring eggs, comprising subjecting loose unwashed herring eggs to a saline washing stage, subjecting the loose washed herring eggs obtained from the washing stage to a cohesion stage, subjecting a coherent mass of herring eggs obtained from the cohesion stage to a quick freezing stage, defrosting the frozen herring eggs obtained form the quick freezing stage, and subjecting the defrosted coherent mass of herring eggs to a curing stage for the curing thereof, said saline washing stage comprising a first washing stage and one or more subsequent washing stages, said subsequent washing stages including at least a final washing stage, each of the washing stages comprising contacting a mass of loose herring eggs with an aqueous washing saline solution comprising seawater so as to obtain an aqueous mixture comprising an upper aqueous saline layer and a lower aqueous saline layer, said lower aqueous saline layer comprising a mass of loose, washed herring eggs, and separating said upper layer from said lower layer, each subsequent washing stage treating the herring eggs of the lower layer of a prior washing stage, said first washing stage comprising contacting a mass of loose unwashed herring eggs with said aqueous washing saline solution, the loose washed herring eggs of the lower layer of the final washing stage being subjected to said cohesion stage, said cohesion stage comprising soaking a mass of the washed loose herring eggs, obtained from said saline washing stage, in a gathered together state in an aqueous cohesion saline solution comprising seawater for a time period of up to 1 hour to obtain said coherent mass of herring eggs, said cohesion stage including exposure of the herring eggs to air, said quick freezing stage being a quick freezing stage wherein said coherent mass of herring eggs obtained from the cohesion stage is brought to a freezing temperature of −40° C. or lower, said curing stage comprising soaking the defrosted coherent mass of herring eggs in an aqueous saline solution saturated with sodium chloride for a time period of at least 20 hours to obtain a cured coherent mass of herring eggs, said process including, prior to the washing stage, a prior quick freezing stage wherein unwashed loose herring eggs are brought to a freezing temperature of −40° C. or lower, the eggs being defrosted prior to being subjected to the washing stage, wherein the herring eggs are washed at a temperature in the range of from 2° C. to 15° C., wherein for the cohesion stage the herring eggs are maintained at a temperature in the range of from 2° C. to 15° C., and wherein, for the cohesion stage, the exposure of the herring eggs to air comprises pouring loose eggs and saline solution of the lower layer of the final washing stage through air into a mold.

4. A process for the preparation of a coherent mass of herring eggs, comprising subjecting loose unwashed herring eggs to a saline washing stage, subjecting the loose washed herring eggs obtained from the washing stage to a cohesion stage, subjecting a coherent mass of herring eggs obtained from the cohesion stage to a quick freezing stage, defrosting the frozen herring eggs obtained from the quick freezing stage, and subjecting the defrosted coherent mass of herring eggs to a curing stage for the curing thereof, said saline washing stage comprising a first washing stage and one or more subsequent washing stages, said subsequent washing stages including at least a final washing stage, each of the washing stages comprising contacting a mass of loose herring eggs with an aqueous washing saline solution comprising seawater so as to obtain an aqueous mixture comprising an upper aqueous saline layer and a lower aqueous saline layer, said lower aqueous saline layer comprising a mass of loose, washed herring eggs, and separating said upper layer from said lower layer, each subsequent washing stage treating the herring eggs of the lower layer of a prior washing stage, said first washing stage comprising contacting a mass of loose unwashed herring eggs with said aqueous washing saline solution, the loose washed herring eggs of the lower layer of the final washing stage being subjected to said cohesion stage, said cohesion stage comprising maintaining a wet mass of the washed loose herring eggs obtained from said saline washing stage, in a gathered together state for a time period of up to 30 minutes to obtain said coherent mass of herring eggs, said quick freezing stage being a quick freezing stage wherein said coherent mass of herring eggs obtained from the cohesion stage is brought to a freezing temperature of −35° C. to −50° C., said curing stage comprising soaking the defrosted coherent mass of herring eggs in an aqueous saline solution saturated with sodium chloride for a time period of at least 20 hours to obtain a cured coherent mass of herring eggs, said process including, prior to the washing stage, a prior quick freezing stage wherein unwashed loose herring eggs are brought to a freezing temperature of −40° C. or lower, the eggs being defrosted prior to being subjected to the washing stage, wherein the herring eggs are washed at a temperature in the range of from 2° C. to 15° C., wherein for the cohesion stage the herring eggs are maintained at a temperature in the range of from 2° C. to 15° C., and wherein the lower layer of said final washing stage is subjected to a separation treatment wherein aqueous saline solution is separated from the loose washed eggs so as to obtain loose wet herring eggs, and a mass of the obtained loose wet herring eggs is subjected to said cohesion stage, said cohesion stage including exposing the obtained mass of wet herring eggs to air.

5. A process for the preparation of a coherent mass of herring eggs, comprising subjecting loose unwashed herring eggs to a saline washing stage, subjecting the loose washed herring eggs obtained from the washing stage to a cohesion stage, and subjecting a coherent mass of herring eggs obtained from the cohesion stage to a curing stage for the curing thereof, said saline washing stage comprising contacting the loose unwashed herring eggs with an aqueous washing saline solution comprising sodium chloride so as to obtain washed loose herring eggs, said sodium chloride being present in the washing saline solution at a concentration in the range of 4% to 20% of sodium chloride saturation, said cohesion stage comprising maintaining a wet mass of the washed loose herring eggs, obtained from said saline washing stage in a gathered together state for a time period sufficient to obtain said coherent mass of herring eggs, said cohesion stage including exposure of the herring eggs to air by pouring the washed loose herring eggs and saline solution through air into a mold or by draining the aqueous saline solution from the washed loose herring eggs, said curing stage comprising soaking a coherent mass of herring eggs in an aqueous saline solution saturated with sodium chloride for a time period sufficient to obtain a cured coherent mass of herring eggs.

6. A process for the preparation of a coherent mass of herring eggs, comprising subjecting loose unwashed herring eggs to a saline washing stage, subjecting the loose washed herring eggs obtained from the washing stage to a cohesion stage, and subjecting a coherent mass of herring eggs obtained from the cohesion stage to a curing stage for the curing thereof, said saline washing stage comprising a first washing stage and one or more subsequent washing stages, said subsequent washing stages including at least a final washing stage, each of the washing stages comprising contacting a mass of loose herring eggs with an aqueous washing saline solution comprising sodium chloride at a concentration in the range of 4% to 20% of sodium chloride saturation, so as to obtain an aqueous mixture comprising an upper aqueous saline layer and a lower aqueous saline layer, said lower aqueous saline layer comprising a mass of loose, washed herring eggs, and separating said upper layer from said lower layer, each subsequent washing stage treating the herring eggs of the lower layer of a prior washing stage, said first washing stage comprising contacting a mass of loose unwashed herring eggs with said aqueous washing saline solution, the loose washed herring eggs of the lower layer of the final washing stage being subjected to said cohesion stage, said cohesion stage comprising soaking a mass of the washed loose herring eggs, obtained from said final saline washing stage, in a gathered together state in an aqueous cohesion saline solution comprising sodium chloride at a concentration in the range of 4% to 20% of sodium chloride saturation, for a time period sufficient to obtain said coherent mass of herring eggs, said cohesion stage including exposure of the herring eggs to air, said curing stage comprising soaking a coherent mass of herring eggs in an aqueous saline solution saturated with sodium chloride for a time period sufficient to obtain a cured coherent mass of herring eggs wherein the sodium chloride concentration of the saline solutions, for each washing stage of the washing stage and for the cohesion stage, is at least substantially the same wherein the herring eggs are washed at a temperature in the range of from 2° C. to 15° C., wherein for the cohesion stage the herring eggs are maintained at a temperature in the range of from 2° C. to 15° C. and wherein, for the cohesion stage, the exposure of the herring eggs to air comprises pouring loose eggs and saline solution of the lower layer of the final washing stage through air into a mold.

7. A process as defined in claim 6 wherein for said cohesion stage, said eggs are maintained in said gathered together state for a time period of up to 4 hours.

8. A process as defined in claim 7 wherein for said curing stage, said coherent mass of herring eggs obtained from the cohesion stage is soaked in said saturated sodium chloride solution for a time period of at least 20 hours.

9. A process as defined in claim 8, said process including, subsequent to said cohesion stage, a freezing stage wherein said coherent mass of herring eggs obtained from the cohesion stage is brought to a freezing temperature of −40° C. or lower, the frozen eggs being defrosted prior to being subjected to the curing stage.

10. A process as defined in claim 7, said process including, prior to the washing stage, a quick freezing stage wherein loose unwashed herring eggs are brought to a freezing temperature of −30° C. or lower, the frozen eggs being defrosted prior to being subjected to the washing stage.

11. A process as defined in claim 10 wherein said sodium chloride is present in the washing saline solution at a concentration in the range of 12% to 16% of sodium chloride saturation and said sodium chloride being present in the cohesion saline solution at a concentration in the range of 12% to 16% of sodium chloride saturation.

12. A process as defined in claim 7, said process including, prior to the washing stage, a freezing stage wherein loose unwashed herring eggs are brought to a freezing temperature of from −30° C. to −50° C., the frozen eggs being defrosted prior to being subjected to the washing stage.

13. A process as defined in claim 7, said process including, prior to the washing stage, a quick freezing stage wherein loose unwashed herring eggs are brought to a freezing temperature of −40° C. or lower, the frozen eggs being defrosted prior to being subjected to the washing stage.

14. A process as defined in claim 6 wherein for said cohesion stage, said eggs are maintained in said gathered together state for a time period of up to 1 hour.

15. A process for the preparation of a coherent mass of herring eggs, comprising subjecting loose unwashed herring eggs to a saline washing stage, subjecting the loose washed herring eggs obtained from the washing stage to a cohesion stage, and subjecting a coherent mass of herring eggs obtained from the cohesion stage to a curing stage for the curing thereof, said saline washing stage comprising a first washing stage and one or more subsequent washing stages, said subsequent washing stages including at least a final washing stage, each of the washing stages comprising contacting a mass of loose herring eggs with an aqueous washing saline solution comprising sodium chloride at a concentration in the range of 4% to 20% of sodium chloride saturation, so as to obtain an aqueous mixture comprising an upper aqueous saline layer and a lower aqueous saline layer, said lower aqueous saline layer comprising a mass of loose, washed herring eggs, and separating said upper layer from said lower layer, each subsequent washing stage treating the herring eggs of the lower layer of a prior washing stage, said first washing stage comprising contacting a mass of loose unwashed herring eggs with said aqueous washing saline solution, the loose washed herring eggs of the lower layer of a final washing stage being subjected to said cohesion stage, said cohesion stage comprising maintaining a wet mass of the washed loose herring eggs, obtained from said saline washing stage, in a gathered together state for a time period sufficient to obtain said coherent mass of herring eggs, said cohesion stage including exposure of the herring eggs to air, said curing stage comprising soaking a coherent mass of herring eggs in an aqueous saline solution saturated with sodium chloride, for a time period sufficient to obtain a cured coherent mass of herring eggs, wherein the sodium chloride concentration of the saline solutions, for each washing stage of the washing stage is at least substantially the same, wherein the herring eggs are washed at a temperature in the range of from 2° C. to 15° C., wherein for the cohesion stage the herring eggs are maintained at a temperature in the range of from 2° C. to 15° C. and wherein the second layer of said final washing stage is subjected to a separation treatment wherein aqueous saline solution is drained from the loose washed eggs so as to obtain loose wet herring eggs, and a mass of the obtained loose wet herring eggs is subjected to said cohesion stage, said cohesion stage including exposing the mass of wet herring eggs to air.

16. A process as defined in claim 15 wherein for said cohesion stage, said eggs are maintained in said gathered together state for a time period of up to 4 hours.

17. A process as defined in claim 16 wherein for said curing stage, said coherent mass of herring eggs obtained from the cohesion stage is soaked in said saturated sodium chloride solution for a time period of at least 20 hours.

18. A process as defined in claim 17, said process including, subsequent to said cohesion stage, a freezing stage wherein said coherent mass of herring eggs obtained from the cohesion stage is brought to a freezing temperature of −40° C. or lower, the frozen eggs being defrosted prior to being subjected to the curing stage.

19. A process as defined in claim 16, said process including, prior to the washing stage, a quick freezing stage wherein loose unwashed loose herring eggs are brought to a freezing temperature of −30° C. or lower, the frozen eggs being defrosted prior to being subjected to the washing stage.

20. A process as defined in claim 19 wherein said sodium chloride is present in the washing saline solution at a concentration in the range of 12% to 16% of sodium chloride saturation and said sodium chloride being present in the cohesion saline solution at a concentration in the range of 12% to 16% of sodium chloride saturation.

21. A process as defined in claim 16, said process including, prior to the washing stage, a freezing stage wherein unwashed loose herring eggs are brought to a freezing temperature of from −30° C. to −50° C., the frozen eggs being defrosted prior to being subjected to the washing stage.

22. A process as defined in claim 16, said process including, prior to the washing stage, a quick freezing stage wherein loose unwashed loose herring eggs are brought to a freezing temperature of −40° C. or lower, the eggs being defrosted prior to being subjected to the washing stage.

23. A process as defined in claim 15 wherein for said cohesion stage, said eggs are maintained in said gathered together state for a time period of up to 1 hour.

* * * * *